UNITED STATES PATENT OFFICE.

ROBERT R. ZELL, OF BIRMINGHAM, ALABAMA, ASSIGNOR TO SILICONITE REFRACTORIES COMPANY, OF IRONDALE, ALABAMA.

COMPOSITION FOR MAKING FIRE-BRICK AND FURNACE-LININGS.

1,244,275.  Specification of Letters Patent.  Patented Oct. 23, 1917.

No Drawing.  Application filed February 8, 1917. Serial No. 147,423.

*To all whom it may concern:*

Be it known that I, ROBERT R. ZELL, a citizen of the United States, and resident of Birmingham, in the county of Jefferson and State of Alabama, have invented certain new and useful Improvements in Compositions for Making Fire-Brick and Furnace-Linings, of which the following is a specification.

This invention relates to a new and novel composition for forming refractory fire brick or furnace linings, that will not soften at the highest temperatures used in the production of metal. The brick is formed of the combination of "siliconite," and aluminum sulfate and a refractory bonding element, that will not reduce the refractory properties of these minerals when mixed therewith.

The formation of what is termed in the art a silica brick is well-known, and this comprises silica bonded with lime, the lime acting as a flux to bond the silica together. These bricks are used for fire brick, where they are adapted to be subjected to very high temperatures. However, the use of lime or other ingredients heretofore used as a bonding element has been found impracticable, as the same softens at a much lower temperature than the temperature at which the silica will soften, hence destroying the usefulness of the brick formed thereby. Owing to the refractory properties of silica and alumina, a combination of these constituents in the forming of brick, or for furnace linings has been often tried, but heretofore no practical means of bonding them together has been found. "Siliconite" contains a large percentage of silica, and when combined with the other minerals used in this composition forms a highly refractory product that is able to withstand temperatures much higher than those which will soften fire brick used at the present time. "Siliconite" will withstand a much higher temperature than pure silica but up to the present time no suitable bonding element had been discovered that rendered the "siliconite" suitable for this purpose.

"Siliconite" is a mineral product found in Calhoun county, Alabama. The deposits lie in large beds or lenses. The mineral is of pearly white color, which when thoroughly dried becomes white. It consists primarily, of finely divided or pulverulent silica and is a result of a thorough weathering and leaching of subcarboniferous formations. A chemical analysis of a typical sample of the same dried at 212° Fahr. shows the following:

Silica _____ 97.50%
Oxids of iron and alumina ___ 2.25%
Lime _____ trace (less than 0.10%)
Magnesia _____ 0.16%

99.91

This is a typical sample though frequently samples are obtained from deposits which show a higher silica content and therefore lower in the other constituents. This is called "siliconite" and my brick is made from this natural mineral in the following manner.

The natural "siliconite" is first sized over screens of $\frac{1}{4}''$ mesh, $\frac{1}{16}''$ mesh, and 60 mesh. A mixture is then made of these various sizes by weight as follows:

One-third of $\frac{1}{4}''$ to $\frac{1}{16}''$ mesh,
One-third of $\frac{1}{16}''$ mesh to 60 mesh,
One-third of finer than 60 mesh.

This mixture is then further mixed with about 5% of its weight of aluminum hydrate, (17% alumina), and 5% of its weight of dehydrated gypsum, (calcium sulfate); there is then added to the dry mixture a solution of caustic potash in water, about 10% strength, in sufficient amount to give plasticity to the mass but not in sufficient amount to react alkaline. After thorough mixing the plastic mass is passed to a brick press and molded into brick under a pressure of about 8000 pounds to each 9'' brick.

The brick is then placed in an oven and heated to a temperature of 500° Fahr. for five or six hours when they are ready for use without further burning.

The advantages obtained from this process are first in the bond, which in this case consists of a precipitate of gelatinized alumina and silica formed with the brick itself by the chemical action of the caustic potash on the alum and on the minute particles of the "siliconite". By this means the fusion point of the brick is not diminished by the bond, as in the case of the ordinary silica brick where the bond is lime.

The second advantage lies in the fact that the brick can be sufficiently hardened for use at a low temperature while the ordinary silica brick requires burning in a kiln at a very high temperature.

I claim that by the use of "siliconite" as the base of a refractory composition, to have accomplished the object which has been sought for by manufacturers employing this type of refractory brick, that is the proper bonding of silica and alumina to form a refractory material that will not soften when in use. The various elements of my composition when combined form a highly refractory material adapted for any use. The above described composition will absolutely prevent the vitrification of the bricks or linings, and will form a very useful and efficient article of the class described. The articles formed by this composition are especially adapted for use for metallurgical purposes, although the same may be applied anywhere where they are subjected to very high temperatures, without any danger of the articles softening under the same.

From the foregoing description of the new and novel composition of matter for making fire brick or furnace linings, the manner of applying the same to use, and its function will be readily understood, and it will be seen that I have provided a simple and efficient means for carrying out the objects of this invention.

What I claim as my invention and desire to secure by Letters Patent, is:

1. A plastic composition containing "siliconite."

2. A refractory composition containing "siliconite."

3. A composition including "siliconite," aluminum hydrate and dehydrated gypsum.

4. A plastic refractory composition including the use of "siliconite" as a base therefore.

5. A composition including "siliconite," aluminum hydrate, dehydrated gypsum, and a slight solution of caustic potash.

6. A refractory plastic composition including "siliconite," aluminum hydrate at about 5% of the weight of said body, dehydrated gypsum at about 5% of the weight of said body, and a solution of caustic potash in water at about 10% sufficient to give plasticity to the mass but not in sufficient quantity to cause the same to react alkaline.

In testimony whereof, I affix my signature hereto.

ROBERT R. ZELL.